United States Patent
Spapis et al.

(10) Patent No.: US 12,457,662 B2
(45) Date of Patent: Oct. 28, 2025

(54) NETWORKS, USER EQUIPMENT AND METHODS FOR GEOGRAPHIC AREA BASED DISCONTINUOUS RECEPTION (DRX) CONFIGURATION

(71) Applicant: Nokia Technologies OY, Espoo (FI)

(72) Inventors: Panagiotis Spapis, Munich (DE); Ranganathan Mavureddi Dhanasekaran, Munich (DE); Berthold Panzner, Holzkirchen (DE); Faranaz Sabouri-Sichani, Aalborg (DK); Prajwal Keshavamurthy, Munich (DE); Nuno Manuel Kiilerich Pratas, Gistrup (DK)

(73) Assignee: Nokia Technologies OY, Espoo (FI)

( * ) Notice: Subject to any disclaimer, the term of this patent is extended or adjusted under 35 U.S.C. 154(b) by 677 days.

(21) Appl. No.: 17/677,196

(22) Filed: Feb. 22, 2022

(65) Prior Publication Data
US 2022/0295594 A1    Sep. 15, 2022

Related U.S. Application Data

(60) Provisional application No. 63/158,424, filed on Mar. 9, 2021.

(51) Int. Cl.
*H04W 76/28* (2018.01)
*H04W 72/51* (2023.01)

(52) U.S. Cl.
CPC .......... *H04W 76/28* (2018.02); *H04W 72/51* (2023.01)

(58) Field of Classification Search
USPC .............................. 455/343.5, 574; 370/311
See application file for complete search history.

(56) References Cited

U.S. PATENT DOCUMENTS

| 2016/0219443 | A1 | 7/2016 | Lee et al. | |
|---|---|---|---|---|
| 2022/0159679 | A1* | 5/2022 | Park | H04W 4/46 |
| 2024/0015767 | A1* | 1/2024 | Back | H04L 1/1822 |

FOREIGN PATENT DOCUMENTS

EP    2958395 A1    12/2015

OTHER PUBLICATIONS

*Overall description of Radio Access Network (RAN) aspects for Vehicle-to-everything (V2X) based on LTE and NR*, 3GPP TR 37.985 Release 16, Jul. 2020.
*System Architecture for the 5G System*, 3GPP TS 23.501, Release 15, Sep. 2018.
*Radio Resource Control (RRC)*, 3GPP TR 38.331 Release 15, Oct. 2018.

(Continued)

Primary Examiner — Suhail Khan
(74) *Attorney, Agent, or Firm* — Harness, Dickey & Pierce, P.L.C.

(57) ABSTRACT

A user equipment includes at least one processor and at least one memory including computer program code. The at least one memory and the computer program code are configured to, with the at least one processor, cause the user equipment to obtain a message, the message including information identifying a plurality of discontinuous reception configurations, and use one of the plurality of discontinuous reception configurations based on at least one of a location of the user equipment and a current time.

18 Claims, 8 Drawing Sheets

(56) References Cited

OTHER PUBLICATIONS

*Radio Resource Control (RRC); Protocol Specification,* 3GPP TS 38.331 Release 16, Nov. 2020.
5GAA White Paper on C-V2X Use Cases: Methodology, Examples and Service Level Requirements; published Jun. 19, 2019 <https://5gaa.org/wp-content/uploads/2019/07/5GAA_191906_WP_CV2X_UCs_v1-3-1.pdf>.
5GAA White Paper on Vulnerable-Road-User-Protection, published Aug. 24, 2020 <https://5gaa.org/wp-content/uploads/2020/08/5GAA_XW3200034_White_Paper_Vulnerable-Road-User-Protection.pdf>.
2018 road safety statistics: what is behind the figures?, published Apr. 4, 2019 <https://ec.europa.eu/commission/presscorner/detail/en/MEMO_19_1990>.
*WID revision: NR sidelink enhancement,* RP-201516, 3GPP TSG RAN Meeting #89e, Sep. 14-18, 2020.
*Summary of email discussion on Rel-17 sidelink enhancement,* RP-192745, 3GPP TSG RAN #86, Dec. 9-12, 2019.
Military Standard WGS84 Metric MIL-STD-2401 (Jan. 11, 1994): "Military Standard Department of Defence World Geodetic System (WGS)".

\* cited by examiner

NETWORKS, USER EQUIPMENT AND METHODS FOR GEOGRAPHIC AREA BASED DISCONTINUOUS RECEPTION (DRX) CONFIGURATION

CROSS-REFERENCE TO RELATED APPLICATIONS

This application claims priority under 35 U.S.C. § 119 to U.S. provisional application No. 63/158,424, filed on Mar. 9, 2021, the entire contents of which are incorporated herein by reference.

TECHNICAL FIELD

One or more example embodiments relate to wireless communications networks.

BACKGROUND

Fifth generation (5G) wireless communications networks are the next generation of mobile communications networks. Standards for 5G communications networks are currently being developed by the 3rd Generation Partnership Project (3GPP). These standards are known as 3GPP New Radio (NR) standards.

SUMMARY

The scope of protection sought for various example embodiments is set out by the independent claims. The example embodiments and/or features, if any, described in this specification that do not fall under the scope of the independent claims are to be interpreted as examples useful for understanding various embodiments.

At least one example embodiment provides a user equipment including at least one processor and at least one memory including computer program code, the at least one memory and the computer program code configured to, with the at least one processor, cause the user equipment to obtain a message, the message including information identifying a plurality of discontinuous reception configurations, and use one of the plurality of discontinuous reception configurations based on at least one of a location of the user equipment or a current time.

At least one example embodiment provides a user equipment comprising means for obtaining a message, the message including information identifying a plurality of discontinuous reception configurations and means for using one of the plurality of discontinuous reception configurations based on at least one of a location of the user equipment or a current time.

At least one example embodiment provides a method comprising obtaining a message, the message including information identifying a plurality of discontinuous reception configurations and using one of the plurality of discontinuous reception configurations based on at least one of a location of the user equipment or a current time.

At least one example embodiment provides a non-transitory computer readable medium storing computer readable instructions that, when executed by at least one processor at a user equipment, cause the user equipment to perform a method comprising obtaining a message, the message including information identifying a plurality of discontinuous reception configurations and using one of the plurality of discontinuous reception configurations based on at least one of a location of the user equipment or a current time.

According to at least one example embodiment, the information identifying the plurality of discontinuous reception configurations includes first discontinuous reception configuration information for a first discontinuous reception configuration, the first discontinuous reception configuration information including first location information.

According to at least one example embodiment, the information identifying the plurality of discontinuous reception configurations includes second discontinuous reception configuration information for a second discontinuous reception configuration, the second discontinuous reception configuration information including second location information, and the at least one memory and the computer program code are configured to, with the at least one processor, cause the user equipment to use the first discontinuous reception configuration if the location of the user equipment is identified in the first location information and use the second discontinuous reception configuration if the location of the user equipment is identified in the second location information.

According to at least one example embodiment, the first location information includes zone identification information identifying an area to use the first discontinuous reception configuration.

According to at least one example embodiment, the first location information includes time information identifying a time to use the first discontinuous reception configuration.

According to at least one example embodiment, the first location information includes risk information identifying a level of risk associated with at least one location identified in the first location information.

According to at least one example embodiment, the information identifying the plurality of discontinuous reception configurations includes first discontinuous reception configuration information for a first discontinuous reception configuration, the first discontinuous reception configuration information including first time information.

According to at least one example embodiment, the information identifying the plurality of discontinuous reception configurations includes second discontinuous reception configuration information for a second discontinuous reception configuration, the second discontinuous reception configuration information including second time information, and the at least one memory and the computer program code are configured to, with the at least one processor, cause the user equipment to use the first discontinuous reception configuration if the current time is contained in the first time information and use the second discontinuous reception configuration if the current time equipment is contained in the second time information.

According to at least one example embodiment, the first time information is associated with zone identification information identifying an area to use the first discontinuous reception configuration.

According to at least one example embodiment, the first time information is associated with risk information identifying a level of risk associated with the zone identification information.

According to at least one example embodiment, the at least one memory and the computer program code are configured to, with the at least one processor, cause the user equipment to send first use information to at least one of a radio access network element or another user equipment, the first use information identifying the used discontinuous reception configuration.

According to at least one example embodiment, the at least one memory and the computer program code are configured to, with the at least one processor, cause the user equipment to change the used discontinuous reception configuration to another discontinuous reception configuration of the plurality of discontinuous reception configurations based on the location of the user equipment, and send second use information to the at least one of the radio access network element or the another user equipment, the second use information identifying the other discontinuous reception configuration.

According to at least one example embodiment, the at least one memory and the computer program code are configured to, with the at least one processor, cause the user equipment to change the used discontinuous reception configuration to another discontinuous reception configuration of the plurality of discontinuous reception configurations based on the current time, and send second use information to the at least one of the radio access network element or the another user equipment, the second use information identifying the other discontinuous reception configuration.

According to at least one example embodiment, the at least one memory and the computer program code are configured to, with the at least one processor, cause the user equipment to send the first use information as part of a measurement report.

According to at least one example embodiment, the message is a radio resource control message.

According to at least one example embodiment, the plurality of discontinuous reception configurations are associated with risks of locations within a cell, respectively.

According to at least one example embodiment, the plurality of discontinuous reception configurations include duration time periods associated with the risks.

At least one example embodiment provides an apparatus comprising at least one processor and at least one memory including computer program code, the at least one memory and the computer program code configured to, with the at least one processor, cause the apparatus to obtain a plurality of discontinuous reception configurations, and send a message, the message including information identifying a plurality of discontinuous reception configurations.

At least one example embodiment provides a method comprising obtaining a plurality of discontinuous reception configurations, and sending a message, the message including information identifying a plurality of discontinuous reception configurations.

At least one example embodiment provides a non-transitory computer readable medium storing computer readable instructions that, when executed by at least one processor at an apparatus, cause the apparatus to perform a method comprising obtaining a plurality of discontinuous reception configurations, and sending a message, the message including information identifying a plurality of discontinuous reception configurations.

At least one example embodiment provides an apparatus comprising means for obtaining a plurality of discontinuous reception configurations, and means for sending a message, the message including information identifying a plurality of discontinuous reception configurations.

According to at least one example embodiment, wherein the information identifying the plurality of discontinuous reception configurations includes first discontinuous reception configuration information for a first discontinuous reception configuration, the first discontinuous reception configuration information including first location information.

According to at least one example embodiment, the information identifying the plurality of discontinuous reception configurations includes second discontinuous reception configuration information for a second discontinuous reception configuration, the second discontinuous reception configuration information including second location information, and the message causes the user equipment to use the first discontinuous reception configuration if the location of the user equipment is identified in the first location information and use the second discontinuous reception configuration if the location of the user equipment is identified in the second location information.

According to at least one example embodiment, the first location information includes, zone identification information identifying an area to use the first discontinuous reception configuration.

According to at least one example embodiment, the first location information includes time information identifying a time to use the first discontinuous reception configuration.

According to at least one example embodiment, the first location information includes risk information identifying a level of risk associated with at least one location identified in the first location information.

According to at least one example embodiment, the information identifying the plurality of discontinuous reception configurations includes first discontinuous reception configuration information for a first discontinuous reception configuration, the first discontinuous reception configuration information including first time information.

According to at least one example embodiment, the information identifying the plurality of discontinuous reception configurations includes second discontinuous reception configuration information for a second discontinuous reception configuration, the second discontinuous reception configuration information including second time information, and the message causes the user equipment to use the first discontinuous reception configuration if the current time is contained in the first time information and use the second discontinuous reception configuration if the current time equipment is contained in the second time information.

According to at least one example embodiment, the first time information is associated with zone identification information identifying an area to use the first discontinuous reception configuration.

According to at least one example embodiment, the first time information is associated with risk information identifying a level of risk associated with the zone identification information.

According to at least one example embodiment, the message causes the user equipment to send first use information to at least one of a radio access network element or another user equipment, the first use information identifying the used discontinuous reception configuration.

According to at least one example embodiment, the message causes the user equipment to change the used discontinuous reception configuration to another discontinuous reception configuration of the plurality of discontinuous reception configurations based on the location of the user equipment, and send second use information to the at least one of the radio access network element or the another user equipment, the second use information identifying the other discontinuous reception configuration.

According to at least one example embodiment, the message causes the user equipment to change the used discontinuous reception configuration to another discontinuous reception configuration of the plurality of discontinuous reception configurations based on the current time, and send second use information to the at least one of the radio access network element or the another user equipment, the second use information identifying the other discontinuous reception configuration.

According to at least one example embodiment, the message causes the message is a radio resource control message.

According to at least one example embodiment, the message causes the plurality of discontinuous reception configurations are associated with risks of locations within a cell, respectively.

According to at least one example embodiment, the message causes the plurality of discontinuous reception configurations include duration time periods associated with the risks.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

While one or more example embodiments may be described from the perspective of radio access network (RAN) or radio network elements (e.g., a gNB), user equipment (UE), or the like, it should be understood that one or more example embodiments discussed herein may be performed by the one or more processors (or processing circuitry) at the applicable device. For example, according to one or more example embodiments, at least one memory may include or store computer program code, and the at least one memory and the computer program code may be configured to, with at least one processor, cause a radio network element (or user equipment) to perform the operations discussed herein.

As discussed herein the terminology "one or more" and "at least one" may be used interchangeably.

As discussed herein, a gNB may also be referred to as a base station, access point, enhanced NodeB (eNodeB), or more generally, a radio access network element, radio network element, or network node. A UE may also be referred to herein as a mobile station, and may include a mobile phone, a cell phone, a smartphone, a handset, a personal digital assistant (PDA), a tablet, a laptop computer, a phablet, or the like.

It will be appreciated that a number of example embodiments may be used in combination.

Figure 1:
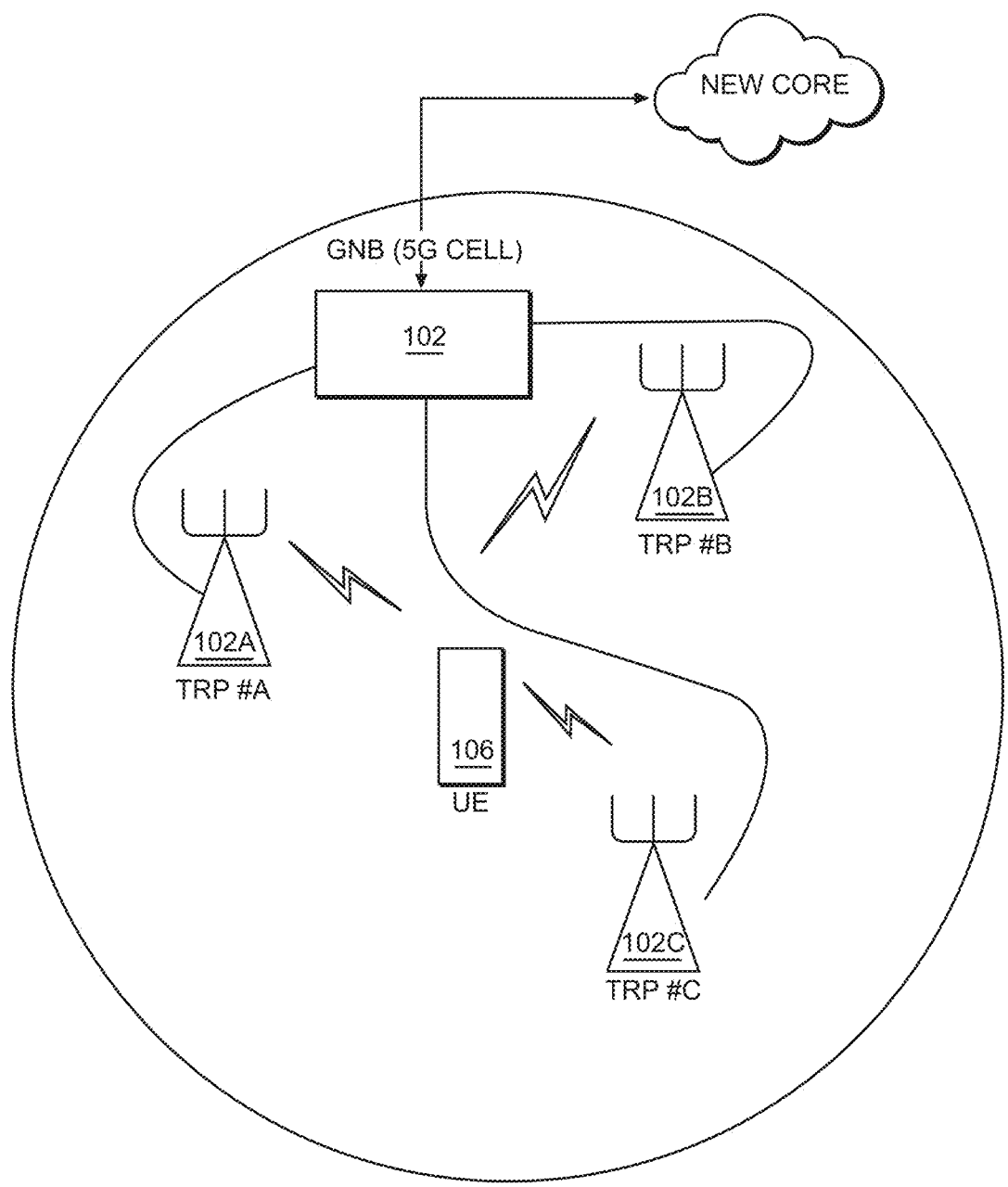
FIG. 1 illustrates a simplified diagram of a portion of a 3rd Generation Partnership Project (3GPP) New Radio (NR) access deployment for explaining example embodiments.

FIG. 1 illustrates a simplified diagram of a portion of a 3GPP NR access deployment for explaining example embodiments in more detail.

Referring to FIG. 1, the 3GPP NR radio access deployment includes a gNB 102 having transmission and reception points (TRPs) 102A, 102B, 102C. Each TRP 102A, 102B, 102C may be, for example, a remote radio head (RRH) or remote radio unit (RRU) including at least, for example, a radio frequency (RF) antenna (or antennas) or antenna panels, and a radio transceiver, for transmitting and receiving data within a geographical area. In this regard, the TRPs 102A, 102B, 102C provide cellular resources for user equipment (UEs) (e.g., UE 106) within a geographical coverage area. In some cases, baseband processing may be divided between the TRPs 102A, 102B, 102C and gNB 102 in a 5th Generation (5G) cell. Alternatively, the baseband processing may be performed at the gNB 102. In the example shown in FIG. 1, the TRPs 102A, 102B, 102C are configured to communicate with UE 106 via one or more transmit (TX)/receive (RX) beam pairs. The gNB 102 communicates with the core network, which is referred to as the New Core in 3GPP NR.

The TRPs 102A, 102B, 102C may have independent schedulers, or the gNB 102 may perform joint scheduling among the TRPs 102A, 102B, 102C.

Although only a single UE 106 is shown in FIG. 1, the gNB 102 and TRPs 102A, 102B, 102C may provide communication services to a relatively large number of UEs within the coverage area of the TRPs 102A, 102B, 102C. For the sake of clarity of example embodiments, communication services (including transmitting and receiving wireless signals) will be discussed as between the gNB 102 and the UE 106. It should be understood, however, that signals may be transmitted between the UE 106 and one or more of the TRPs 102A, 102B, 102C.

Example functionality and operation of the gNB 102 and the UE 106 in the context of radio resource control (RRC) signaling will be discussed in more detail below. Because RRC signaling is generally known, a detailed discussion will not be provided. Moreover, although example embodiments are discussed herein with regard to RRC signaling, example embodiments should not be limited to this example. Rather, other signaling mechanisms may be used.

One or more example embodiments provide mechanisms that may reduce power consumption of a user equipment (UE) in vehicle-to-everything (V2X) communications, such as instances of vulnerable road users (VRUs).

One or more example embodiments may permit the use of multiple discontinuous reception (DRX) configurations in a cell based on a location of a UE.

One or more example embodiments also improve reception of time and safety critical messages for the VRUs.

Vehicular communications are considered to be one of the use case families by 3GPP for 5G. Vehicular communications include (among others) vehicle-to-vehicle (V2V) communications as well as vehicle-to-network (V2N) and vehicle-to-pedestrians (V2P) and they relate to both safety applications and efficiency ones. The vehicle communications may be considered part of vehicle-to-everything communications (V2X).

Road safety is an aspect of mobility for individuals such as vulnerable road users (VRUs). In general, VRU categories include pedestrians, cyclists (including eBikes), motorcyclists, road workers and wheelchair users, but are not limited thereto. One common characteristic of the above described categories is a limited battery capacity of the UE. Additionally, many VRUs may have a similar mobility behavior; for example they follow certain mobility patterns (i.e., they enter areas not accessible by vehicles).

It should be understood that at times reference throughout the specification referring to power capabilities and communications of/with a VRU refer to the power capability and communications of the UE of the particular VRU.

UEs of VRUs have limited power capabilities. To address these limitations, power consumption may be lowered when they are not in an area of interest.

A VRU has the freedom to move into areas which are not relevant for its safety (e.g., parks and buildings). In these areas the UE of the VRU may have relaxed latency requirements. On the other hand, when the VRU moves to areas relevant for its safety (e.g., road crossings) the UE of the VRU should be able to receive (sidelink) messages with desired latency requirements for the areas relevant to safety.

New Radio (NR) sidelink (SL) may be used for UE-to-UE direct communication including vehicle-to-everything (V2X) communications such as described in Overall description of *Radio Access Network (RAN) aspects for Vehicle-to-everything (V2X) based on LTE and NR*, 3GPP TR 37.985 Release 16, July 2020, the entire contents of which are incorporated herein by reference.

Power saving enables UEs with battery constraint to perform sidelink operations in a power efficient manner. In V2X, sidelink is designed based on the assumption of "always-on" when the UE operates sidelink, e.g., only focusing on UEs installed in vehicles with sufficient battery capacity. Solutions for power saving are desired for vulnerable road users (VRUs) in V2X use cases and for UEs in public safety and commercial use cases.

At least one example embodiment introduces sidelink discontinuous reception (DRX) configurations for VRUs and other UEs. The sidelink DRX configurations may define on- and off-durations in sidelink and specify a corresponding UE procedure, specify a mechanism to align sidelink DRX wake-up time among the UEs communicating with each other and specify a mechanism to align sidelink DRX wake-up time with Uu DRX wake-up time in an in-coverage UE. For example, the Uu DRX and SL DRX may be arranged to improve energy saving for a UE.

Discontinuous Reception (DRX) may be used for power saving. As an example, DRX for NR is described in as defined in *System Architecture for the 5G System*, 3GPP TS 23.501, Release 15, September 2018, the entire contents of which are herein incorporated by reference. With DRX, the UE enters a sleep mode for a period of time and wakes up for another period of time to receive messages.

For different UE states, a DRX cycle may be configured as follows:
  RRC_IDLE—A UE specific DRX may be configured by upper layers of the network,
  RRC_INACTIVE—A UE specific DRX may be configured by upper layers or by radio resource control (RRC) layer,
  RRC_CONNECTED—At lower layers, the UE may be configured with a UE specific DRX.

The DRX cycle is configured by the network (e.g., a gNB) with a RRC Reconfiguration message using the DRX-Config information element which contains the following elements:
  drx-onDurationTimer—The duration of UE ON-time within a DRX cycle;
  drx-SlotOffset—the delay before starting the drx-onDurationTimer;
  drx-InactivityTimer—the duration the UE has to remain 'ON' after a Physical Downlink Control Channel (PDCCH) occasion in which a PDCCH indicates a new uplink (UL) or downlink (DL) transmission for the Medium Access Control (MAC) entity;
  drx-RetransmissionTimerDL (per DL hybrid automatic repeat request (HARQ) process except for the broadcast process): the maximum duration until a DL retransmission is received;
  drx-RetransmissionTimerUL (per UL HARQ process): the maximum duration until a grant for UL retransmission is received;
  drx-LongCycleStartOffset: a Long DRX cycle and drx-StartOffset which defines the subframe where the Long and Short DRX Cycle starts;
  drx-ShortCycle (optional): a Short DRX cycle;
  drx-ShortCycleTimer (optional): the duration the UE shall follow the Short DRX cycle;
  drx-HARQ-RTT-TimerDL (per DL HARQ process except for the broadcast process): the minimum duration before a DL assignment for HARQ retransmission is expected by the MAC entity;
  drx-HARQ-RTT-TimerUL (per UL HARQ process): the minimum duration before a UL HARQ retransmission grant is expected by the MAC entity.

Figure 2:
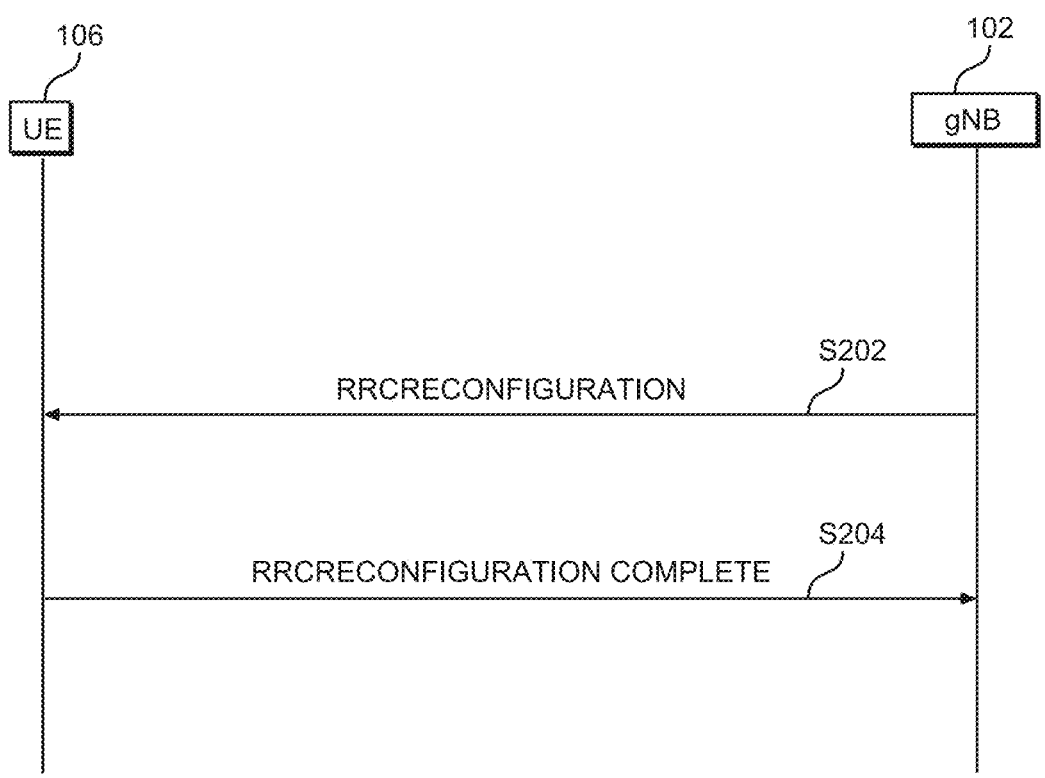
FIG. 2 illustrates a signal flow diagram according to at least one example embodiment.

At a given time, the UE has a specific DRX configuration. If an update in the configuration is needed, the update is provided to the UE using the RRC Reconfiguration message and the DRX-Config information element. As shown in FIG. 2, the gNB 102 may send an RRC Reconfiguration message to the UE 106 at S202. Because RRC (re)configuration messages and exchange thereof between a gNB and a UE are generally known, only a brief discussion is provided below. The RRC Reconfiguration message may include information for the DRX configuration, such as at least one Uu DRX configuration, at least one SL DRX configuration or both at least one Uu DRX configuration and at least one SL DRX configuration. The UE 106 acknowledges the DRX configuration to use by sending an RRC Reconfiguration Complete message to the gNB 102 at S204.

Updates to the DRX configuration may happen upon a network decision or network procedures, e.g., upon cell reselection or handover.

However, if DRX with long periods of dormancy is introduced and the VRU is located in an area relevant to safety (e.g., an area having a particular risk level or higher), then the UE of the VRU may not receive time and safety critical messages (e.g., basic safety message (BSM), cooperative awareness message (CAM), decentralized environmental notification message (DENM) messages or any other safety alerts) in time.

Figure 3:
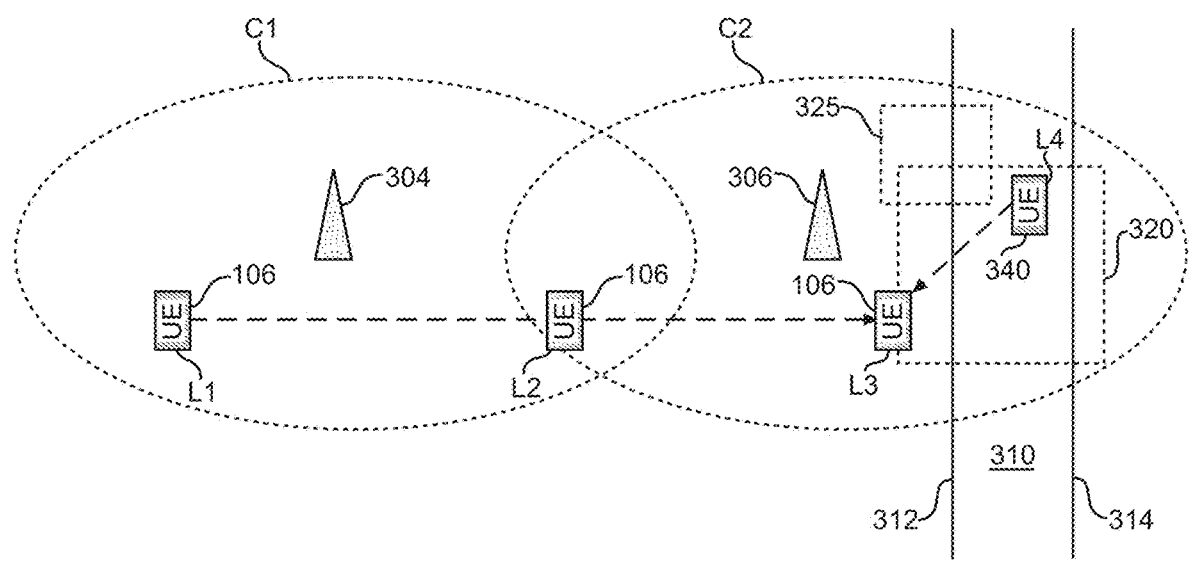
FIG. 3 illustrates a system diagram according to at least one example embodiment.

FIG. 3 illustrates a system diagram according to at least one example embodiment.

As shown in FIG. 3, a UE 106 is under coverage of a cell C1 at a location L1. When the UE 106 moves to a location L2, the UE 106 is under coverage of a cell C2.

A road 310 is defined by boundaries 312 and 314. The road 310 passes through the coverage of the cell C2. Within the coverage of the cell C2 and including portions of the road 310 are a first VRU relevance area 320 and a second VRU relevance area 325. The first VRU relevance area 320 and the second VRU relevance area 325 may be overlapping. The first VRU relevance area 320 and the second VRU relevance area 325 may be designated VRU relevance areas because of their location within a street and/or inclusion of a street crossing, for example. However, example embodiments are not limited thereto and other areas may be designated as VRU relevance areas. In at least some example embodiments, the VRU relevance areas 320 and 325 present increased risk to a VRU. While two VRU relevance areas are illustrated in FIG. 3, a cell may include more or less than two VRU relevance areas. Moreover, the VRU relevance areas may be overlapping or non-overlapping.

The VRU relevance areas may be set based on empirical data and a risk to the VRU. In at least one example embodiment, the VRU relevance areas may be fixed and dedicated to particular geographical locations such as a road intersection.

In FIG. 3, the UE 106 is under a coverage of a cell which does not include any high risk area for VRUs (e.g., the cell C1) and moves to a neighboring cell (i.e., the cell C2) which includes one (or more) VRU relevance areas (e.g., a street and/or a street crossing). For UEs in the first VRU relevance 320 and second VRU relevance area 325, various warning and emergency messages are disseminated to vehicles/VRUs at a higher frequency than when outside of the first VRU relevance 320 and second VRU relevance area 325.

When the UE 106 is located in at least one of the first VRU relevance 320 or second VRU relevance area 325, the UE 106 should be able to receive warning messages in time.

Accordingly, at least one example embodiment enables sidelink (SL) communication with multiple SL DRX configurations based on a UE being in selected and/or determined geographic areas. By providing multiple SL DRX configurations, VRUs may improve energy efficiency in areas where emergency messages are not expected by using one SL DRX configuration and use another SL DRX configuration when in a VRU relevance area. By using the other SL DRX configuration, a UE of a VRU may monitor a Physical Sidelink Control Channel (PSCCH) and Physical Sidelink Shared Channel (PSSCH) at an increased frequency (relative to a monitoring rate outside of a VRU relevance area) to acquire low latency service data such as emergency V2X messages.

In one or more example embodiments, VRU relevance areas are defined by their coordinates and are assigned a risk level according to their road safety risk exposure to the UE. The UE will apply the corresponding SL DRX configurations of the particular VRU relevance area based on its own location. The risk level may be determined by a network operator or management system based on empirical data of areas concerning safety and risk associated with a VRU.

The radio access network element stores information of the plurality of SL DRX configurations and the associated VRU relevance areas, respectively. In one or more example embodiments, a radio access network element stores a table linking each VRU relevance area and a SL DRX configuration to use in the VRU relevance area. In addition, the network access element may store an SL DRX configuration for a UE to use when not in a VRU relevance area (e.g., the radio access network element stores a mapping of VRU relevance areas and SL DRX configurations).

A UE outside a VRU relevance area of a cell may use a SL DRX configuration targeting power saving (i.e., relatively short DRX_on and relatively long sleep periods compared to at least another SL DRX configuration for the cell) while a UE inside a VRU relevance area of the cell marked with a higher risk level will apply a SL DRX configuration that prioritizes reception of emergency messages over power saving (i.e., relatively long DRX_on periods and relatively short sleep periods compared to a power saving SL DRX configuration or even no DRX at all, depending on the risk level).

The term "relaxed SL DRX configuration" may refer to a SL DRX configuration intended for power saving (i.e., relatively short DRX_on and relatively long sleep periods) and the term "stringent SL DRX configuration" may refer to a SL DRX configuration for receiving emergency messages (e.g., relatively long DRX_on periods and relatively short sleep periods or no DRX).

Referring back to FIG. 3, the UE 106 is in a RRC_CONNECTED state at the location L1. When the UE 106 is handed-over to the cell C2, the UE 106 receives a message (e.g., RRC Reconfiguration message) including information identifying a plurality DRX configurations for a PC5 interface. Sidelink communication occurs over the PC5 interface.

In an example where the information includes two SL DRX configurations, the message includes first discontinuous reception information for a first SL DRX configuration and second discontinuous reception information for a second SL DRX configuration.

In one or more example embodiments, the first SL DRX configuration may be considered a default SL DRX configuration and the second SL DRX configuration includes a SL DRX configuration for a VRU relevance area. Moreover, the first SL DRX configuration may be a relaxed SL DRX configuration and the second SL DRX configuration may be a more stringent SL DRX configuration (i.e., longer DRX_on period and shorter sleep period compared to the first SL DRX configuration). In one or more example embodiments, the default SL DRX configuration may be associated with a risk level of zero. In other example embodiments, default SL DRX configuration may be associated with a lowest risk level in the cell. However, example embodiments are not limited thereto.

In an example where a cell contains two SL DRX configurations, when a UE 106 outside of a VRU relevance area, the UE applies the first SL DRX configuration and when the UE enters the VRU relevance area, the UE switches to the second SL DRX configuration.

In some example embodiments, two VRU relevance areas may have the same SL DRX configuration.

In other example embodiments and as will be described in greater detail below, the UE 106 may obtain information identifying a discontinuous reception configuration for each VRU relevance area under the coverage of the cell in which the UE 106 is present.

In the example shown in FIG. 3, the UE 106 receives information from a gNB 304 when at location L1. When the UE 106 enters the cell C2, the UE 106 receives information from a gNB 306 through an RRC Reconfiguration message (e.g., as part of a handover procedure) for a plurality of (two or more) SL DRX configurations from. More specifically, the RRC Reconfiguration message includes a DRX-Config information element, which includes the information identifying the plurality of discontinuous reception configurations. It at least one or more example embodiments, if the UE 106 receives an RRC Reconfiguration message for a reason other than a handoff, the UE 106 may update the SL DRX configurations to use based on the SL DRX configurations in the particular RRC Reconfiguration message.

The information for the plurality of discontinuous reception configurations are associated with risks of locations within a cell, respectively. In one or more examples, the number of discontinuous reception configurations identified by the information for the plurality of SL DRX configurations is the number of VRU relevance areas in a cell plus one. The plus one SL DRX configuration is an SL DRX configuration to be used when the UE 106 is not in a VRU relevance area. The remaining SL DRX configurations are associated with the VRU relevance areas, respectively. Using FIG. 3 as an example, the UE receives information for three SL DRX configurations: a first SL DRX configuration to use when out of the first relevance area 320 and the second relevance area 325; a second SL DRX configuration to use when in the first relevance area 320; and a third SL DRX configuration to use when in the second relevance area 325.

As will be described in greater detail below, when the UE is in the area overlapping the relevance areas 320 and 325, the UE may use the SL DRX configuration that prioritizes reception of emergency messages the most among the second and third SL DRX configurations (i.e., longer DRX_on period and shorter sleep period among the second and third SL DRX configurations).

When the UE 106 is at the location L2, the UE 106 may use the first SL DRX configuration when outside of the VRU relevance areas 320 and 325. When the UE 106 is at the locations L3, the UE 106 may use the second SL DRX configuration to prioritize reception of emergency messages over power saving. Thus, when a UE 340 broadcasts a message, the UE 106 receives the broadcasted message using the second SL DRX configuration.

Figure 4A:
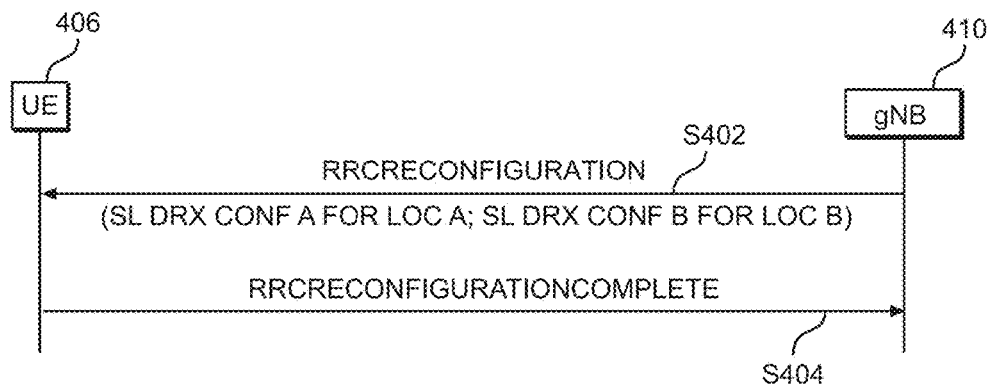
FIG. 4A illustrates a signal flow diagram illustrating a method of sending and receiving a plurality of SL DRX configurations according to example embodiments.

FIG. 4A illustrates a signal flow diagram illustrating a method of sending and receiving a plurality of SL DRX configurations according to example embodiments. In the example shown in FIG. 4A, a radio access network element (e.g., a gNB 410) sends an RRC Reconfiguration message to a UE 406 at S402. The RRC Reconfiguration message includes information identifying two SL DRX configurations. More specifically, the RRC Reconfiguration includes information for an SL DRX configuration A to be used in a location A (SL DRX Conf A for Loc A) and an SL DRX configuration B to be used in a location B (SL DRX Conf B for Loc B).

In one or more example embodiments, location B may be a VRU relevance area and location A may be areas outside the VRU relevance area. In examples where a cell includes multiple VRU relevance areas, the location A may be areas outside of the VRU relevance areas.

The SL DRX configuration A targets power saving (i.e., relatively short DRX_on and relatively long sleep periods compared to at least another DRX configuration for the cell) while the SL DRX configuration B prioritizes reception of emergency messages over power saving (i.e., relatively long DRX_on periods and relatively short sleep periods compared to power saving DRX configuration or even no DRX at all, depending on the risk level).

The information for each SL DRX configuration may be included in an existing DRX-Config information element (as set forth in Radio Resource Control (RRC), 3GPP TR 38.331 Release 15, October 2018, the entire contents of which are incorporated herein by reference):
 drx-onDurationTimer;
 drx-SlotOffset;
 drx-InactivityTimer;
 drx-RetransmissionTimerDL (per DL HARQ process except for the broadcast process; drx-RetransmissionTimerUL (per UL HARQ process);
 drx-LongCycleStartOffset;
 drx-ShortCycle (optional);
 drx-ShortCycleTimer (optional);
 drx-HARQ-RTT-TimerDL (per DL HARQ process except for the broadcast process);
 drx-HARQ-RTT-TimerUL (per UL HARQ process).

Moreover, in one more example embodiments, the DRX-Config information element in the information for each SL DRX configuration may include location information identifying an area (e.g., a VRU relevance area) to use the particular SL DRX configuration.

In one or more example embodiments, the information for each SL DRX configuration may be in fields of the DRX-Config information element as an extension. In other example embodiments, the information for SL DRX configurations may be in a message that is marked differently that the DRX-Config information element. For example, the message may include the same features as the DRX-Config information element, but are specific to SL DRX. In other examples, message may include some of the features as the DRX-Config information element. In still further examples, the message may include new features.

Referring back to FIG. 4A, the UE 406 sends an RRC Reconfiguration Complete message to the radio access network element at S404 to confirm completion of the RRC Reconfiguration.

The UE 406 may receive updated SL DRX configurations with the RRC Reconfiguration message anytime, and not directly related to a handover procedure. For example, the UE 406 may receive updated SL DRX configurations in instances where the network element sends the UE 406 RRC Reconfiguration messages such as to establish/modify/release resource blocks, to perform reconfiguration with synchronization, to setup/modify/release measurements, to add/modify/release SCells and cell groups, to add/modify/release a conditional handover configuration, and to add/modify/release a conditional PSCell change configuration. The same operations described in FIG. 4A may be applied to the UE 106 and the gNB 306.

Figure 4B:
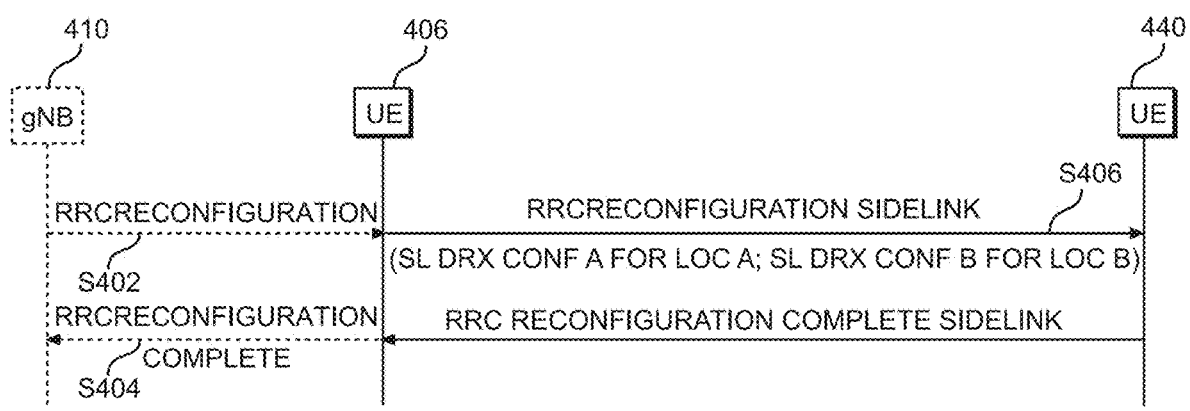
FIG. 4B illustrates a signal flow diagram illustrating a method of sending and receiving a plurality of SL DRX configurations according to example embodiments.

FIG. 4B illustrates a signal flow diagram illustrating a method of sending and receiving a plurality of SL DRX configurations according to example embodiments.

In FIG. 4B, the plurality of SL DRX configurations may be communicated over the PC5 interface between a UE 406 and a UE 440. More specifically, the UE 406 sends an RRC Reconfiguration Sidelink message to the UE 440 at S406 (RRC Reconfiguration Sidelink messages are described in *Radio Resource Control (RRC); Protocol Specification,* 3GPP TS 38.331 Release 16, November 2020, the entire contents of which are incorporated herein by reference). The RRC Reconfiguration Sidelink message includes information identifying two SL DRX configurations. More specifically, the RRC Reconfiguration Sidelink message includes information for the SL DRX configuration A to be used in the location A (SL DRX Conf A for Loc A) and the SL DRX configuration B to be used in the location B (SL DRX Conf B for Loc B).

In one or more example embodiments, the UE 406 receives the two SL DRX configurations to send to the UE 440 from the network (e.g., the gNB) 410 using the process described with respect to FIG. 4A. In other example embodiments, the SL DRX configurations may be agreed between the UE 406 and the UE 440 with the network (e.g., the gNB 410) defining the VRU relevance areas for the SL DRX configurations. While FIG. 4B illustrates the UE 406 sends the SL DRX configurations to one UE 440, it should be understood that the UE 406 may send SL DRX configurations to additional UEs such as UEs that are outside a coverage area of a particular cell but within communication range of the UE and/or in a within a VRU relevance area.

The information in the RRC Reconfiguration Sidelink Message associated with the SL DRX configurations may be the same and structured in a similar manner as described with reference to FIG. 4A.

At S408, the UE 440 sends an RRC Reconfiguration Sidelink Complete message to the UE 406 to confirm completion of the RRC Reconfiguration Sidelink.

Figure 5:
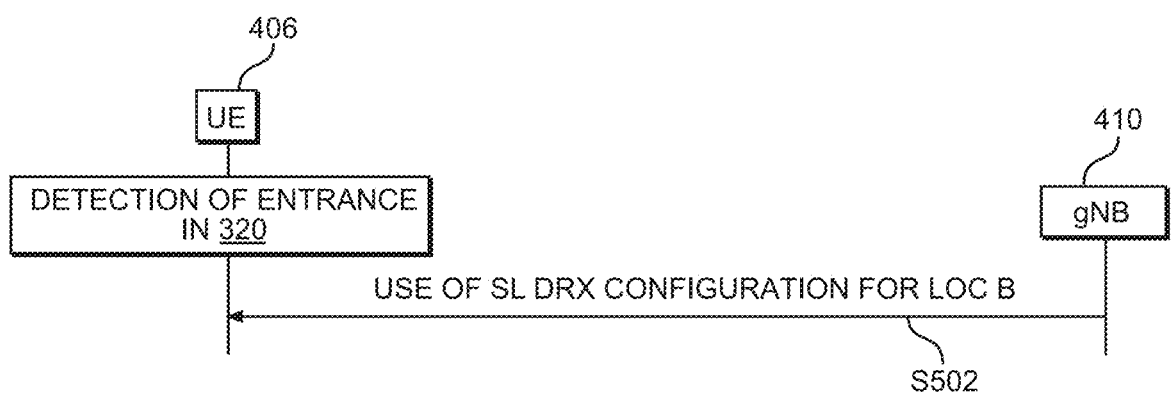
FIG. 5 illustrates a signal flow diagram illustrating a method of notifying a radio access network element of a sidelink (SL) discontinuous reception (DRX) configuration being used according to example embodiments.

FIG. 5 illustrates a signal flow diagram illustrating a method of notifying a radio access network element of a SL DRX configuration being used according to example embodiments.

In one or more example embodiments, the UE 406 can notify the radio access network element (e.g., the gNB 410) that it uses a more stringent SL DRX configuration (e.g., the SL DRX configuration B) at S502. The UE 406 may notify the radio access network element using the LocationMeasurementInfo information element (as set forth in *Radio Resource Control (RRC)*, 3GPP TR 38.331 Release 15, October 2018, the entire contents of which are incorporated herein by reference). Because the radio access network element 410 stores information of the plurality of SL DRX configurations and the associated VRU relevance areas, respectively, the radio access network element is able to determine the SL DRX configuration being used by the UE 406 based on the location of the UE 406. In other words, the LocationMeasurementInfo information element implicitly identifies the SL DRX configuration being used. The same operations described in FIG. 5 may be applied to the UE 106 and the gNB 306.

In other example embodiments, the UE may use a separate message to inform the radio access network element about a change in the SL DRX configuration being used by the UE.

By informing the gNB of the SL DRX configuration being used, the gNB may coordinate the SL DRX cycles for the Uu and for the PC5 interface. This way the gNB is also able to schedule messages from the vehicles to the VRUs in case of PC5 Mode 1 operation and unicast or multicast transmissions, apart from broadcast messages in PC5 Modes 1 and 2.

As mentioned above, the information identifying the plurality of discontinuous reception configurations sent by the radio access network element (and received by the UE) includes location information in the DRX-Config information element.

The location information may identify the VRU relevance areas. A VRU relevance area can be identified in the location information by zone identification information (VRU-zone_id), time information (SL-VRUValidityTime) and a VRU risk level (SL-VRURiskLevel). The zone identification information identifies an area to use the SL DRX configuration associated with the VRU relevance area and the time information identifies a time to use the SL DRX configuration associated with the VRU relevance area.

Moreover, the zone identification information, time information and risk level may be formatted according to the ASN.1 notation used in the RRC specification as shown below:

```
-- ASN1START
-- TAG-SL-VRURELEVANCEAREACONFIG-START
SL-VRURelevanceAreaConfig-r17 ::=    SEQUENCE {
    sl-VRUzoneID-r17                 INTEGER (0..4095) OPTIONAL, --Need M
    sl-VRUZoneConfig-r17             SL-VRUZoneConfig-r17  OPTIONAL, --
Need M
    sl-VRUValidityTime-r17           SL-VRUValidityTime-r17  OPTIONAL,
--Need M
    sl-VRURiskLevel-r17              INTEGER (1..maxRiskLevel-r17)
    OPTIONAL, --Need M
}
SL-VRUZoneConfig-r17 ::=   SEQUENCE {
    sl-VRUZoneLength-r17      ENUMERATED {m5, m10, m20, m30, m40,
m50, spare2, spare1},
    sl-VRUZoneWidthth-r17          ENUMERATED {m5, m10, m20, m30, m40,
m50, spare2, spare1},
}
SL-VRUValidityTime-r17 ::=  SEQUENCE {
  sl- VRUValidityTimeStart-r17      BIT STRING (SIZE (48)),
    sl- VRUValidityTimeStop-r17       BIT STRING (SIZE 48)),
}
-- TAG- SL-VRURELEVANCEAREACONFIG-STOP
-- ASN1STOP
```

The descriptions of the ASN.1 representation is provided in Table 1 below.

TABLE 1

| Term | Description |
| --- | --- |
| sl-VRUzoneID | zone identification for the corresponding SL-VRURelevanceAreaConfig |
| sl-VRUZone Config | zone configuration for the corresponding SL-VRURelevanceAreaConfig |
| sl-VRUValidityTime | validity period for the corresponding SL-VRURelevanceAreaConfig |
| sl-VRURiskLevel | risk level associated with each VRU relevance area, where 1 represents low risk (not considered dangerous for VRUs) and maxRiskLevel-r17 represents highest risk level (considered very dangerous for VRUs) |
| sl-VRUZoneLength | length of each VRU relevance area |
| sl-VRUZoneWidth | width of each VRU relevance area |
| sl-VRUValidityTimeStart | an absolute time in a format YY-MM-DD HH:MM:SS and using BCD encoding for the starting of the validity period of the SL DRX configuration |
| sl-VRUValidityTimeStop | an absolute time in a format YY-MM-DD HH:MM:SS and using BCD encoding for the stop of the validity period of the SL DRX configuration |

The zone identification information VRUzone_id is a geographic zone of the VRU relevance area and may be defined using the zone configuration SL-VRUZoneConfig as follows:

$x_1$=Floor (x/L) Mod 64;
$y_1$=Floor (y/W) Mod 64;
VRUzone_id=$y_1$*64+$x_1$.

where L is the value of sl-VRUZoneLength included in SL-VRUZoneConfig, W is the value of sl-VRUZoneWidth included in SL-VRUZoneConfig, x is a geodesic distance in longitude between a location of a UE and geographical coordinates (0, 0) according to the WGS84 model set forth in Military Standard WGS84 Metric MIL-STD-2401 (Jan. 11, 1994), the entire contents of which are herein incorporated by reference, and it is expressed in meters, y is a geodesic distance in latitude between UE's current location and geographical coordinates (0, 0) according to the WGS84 model and it is expressed in meters.

The VRUzone_id may be determined in advance using the equations above. The UE determines in which VRU-zone_id it resides using its current location.

While the above example of a VRU relevance area uses a 64×64 grid, other potential implementations may be used.

The validity time SL-VRUValidityTime may be the time that the UE may use SL DRX configuration for the VRU relevance area. Outside the defined time limits, the UE may use the SL DRX configuration (e.g., a default configuration) for non-VRU relevance areas (i.e., areas that are not VRU relevance areas). In other example embodiments, the UE change the SL DRX configuration to an SL DRX configuration for the defined time.

In one or more example embodiments, the validity time SL-VRUValidityTime is defined by the following parameters:

VRUValidityTimeStart—indicates an absolute time in a format YY-MM-DD HH:MM:SS and using BCD encoding for the starting of the validity period of the SL DRX configuration VRUValidityTimeStop—indicates an absolute time in a format YY-MM-DD HH:MM:SS and using BCD encoding for the stop of the validity period of the SL DRX configuration.

In other example embodiments, repetitive validity patterns may be defined, indicating that the SL DRX configuration for a particular VRU relevance area is valid for a particular time every day. For example, all the YY-MM-DD fields of the VRUValidityTimeStart and the VRUValidityTimeStop as could be indicated as 00-00-00.

The VRU risk level VRURiskLevel indicates a safety risk level associated with each VRU relevance area. As an example, a VRU-risk level with a value of 1 represents a low risk and a maxRiskLevel-r17 represents a highest risk level. The SL DRX configurations can then span between a relaxed SL DRX configuration (e.g., a default) toward a most stringent SL DRX configuration (no DRX). In one or more example embodiments, if there are two or more overlapping VRU relevance areas at a given location, the UE applies the SL DRX configuration with the highest VRU-risk level.

In another embodiment, instead of using the VRU-zone_id, the location for the VRU Relevance Area can be defined by ways other than the rectangular shape described above such as exact/abstract location information (e.g., [Point Coordinates, Radius]), location type (VRU/Application relevant) and roadside unit (RSU) related signals that inform the UE to switch to another DRX operation mode.

Figure 6:
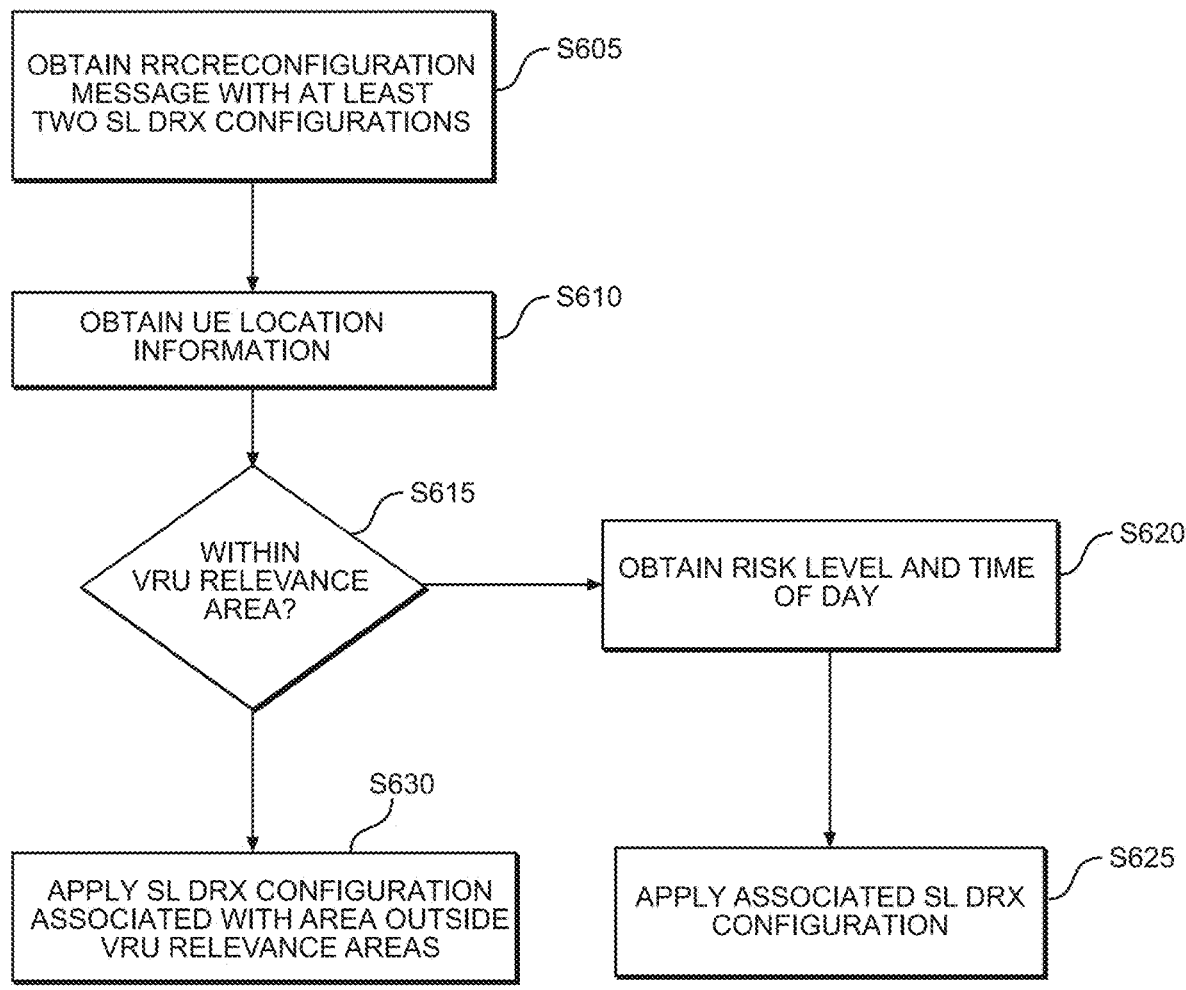
FIG. 6 illustrates a method of using an SL DRX configuration according to one or more example embodiments.

FIG. 6 illustrates a method of using an SL DRX configuration according to one or more example embodiments. The steps in FIG. 6 may be performed by a UE including at least one processor and at least one memory including computer program code where the at least one memory and the computer program code are configured to, with the at least one processor, cause the UE to perform the steps shown in FIG. 6.

At S605, the UE obtains an RRC Reconfiguration Message from a radio access network element (e.g., a gNB). The RRC Reconfiguration message includes information identifying a plurality of SL DRX configurations. Moreover, the RRC Reconfiguration message identifies VRU relevance areas in which to use the plurality SL DRX configurations, respectively.

At S610, the UE obtains location information. For example, the UE determines its location using a location related measurement.

At S615, the UE determines whether the UE is within a VRU relevance area using its location. If the UE determines that it is within a VRU relevance area, the UE obtains a risk level and a validity time associated with the VRU relevance area at S620.

At S625, the UE applies an SL DRX configuration based on its location, risk level of the VRU relevance area and validity time. More specifically, the UE determines whether a current time to use the SL DRX configuration for the VRU relevance area is within the validity time. In addition, if the UE determines it is within multiple VRU relevance areas, the UE determines the VRU relevance area with the highest risk level. The UE then uses the SL DRX configuration for the VRU relevance area with the highest risk level and where the current time is within the validity time of the particular SL DRX configuration.

If the UE determines that its location is not within a VRU relevance area at S615, the UE applies the SL DRX configuration for areas outside the VRU relevance areas at S630.

In other example embodiments, the UE request for a SL DRX configuration change when the location of the UE is within a VRU relevance area. The UE can be aware of the VRU relevance area via application information (e.g., from V2X Control Function, Application Function, etc.). Alternatively, a gNB may configure (e.g., during handover) the UE to trigger a SL DRX configuration change once the UE enters the VRU relevance area. Upon receiving a trigger from the UE, the gNB provides information regarding a SL DRX configuration to use in the VRU relevance area. The message to request the new SL DRX configuration can be a new RRC message. Alternatively, the network, based on the UE LocationMeasurementInfo of the measurement report, can deduce that the UE enters the VRU relevance area and provide to the UE the updated SL DRX configuration using RRC signaling.

In case the UE is in a RRC_IDLE or a RRC_INACTIVE state, the SL DRX configuration of the PC5 interface on a location basis (as in the RRC_CONNECTED case) may be provided by the radio access network element via one of the following ways:
- broadcast messages (e.g., using modified System Information Blocks (SIB)-SIB 12),
- preconfiguration through the policy control function (PCF), V2X control function, or
- preconfigured in the universal subscriber identity module (USIM),
- using RRC Connection Release message, or
- forwarding from other UEs who are in coverage.

Figure 7:
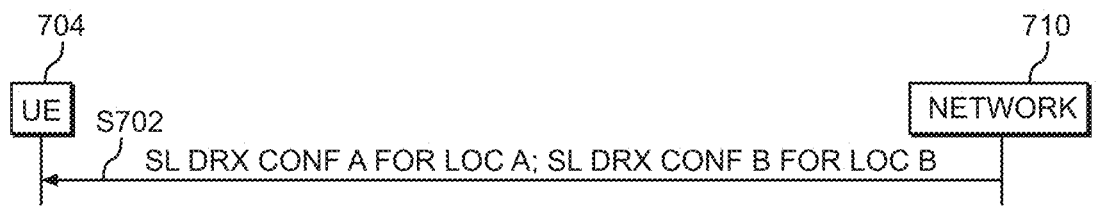
FIG. 7 illustrates a signal diagram of a network using a broadcast message containing SL DRX configurations for two locations according to one or more example embodiments.

FIG. 7 illustrates a signal diagram of a network using a broadcast message containing SL DRX configuration for two locations, A and B, according to one or more example embodiments. As shown, a radio access network element 710 broadcasts a message including information of SL DRX configuration A to be used in a location A and information of an SL DRX configuration B to be used in a location B at S702. The UE 704 receives the broadcast message.

Figure 8:
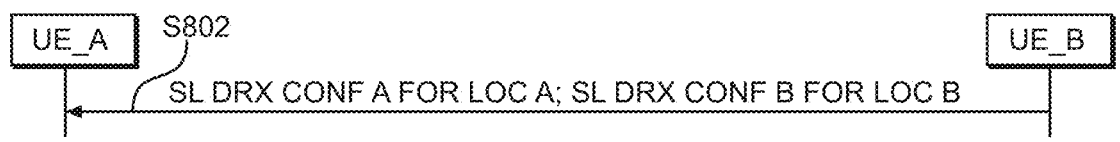
FIG. 8 shows a signal diagram of forwarding a SL DRX configuration by a UE who is under coverage over a cell to a UE who is out of coverage according to one or more example embodiments.

FIG. 8 shows a signal diagram of forwarding SL DRX configurations by a UE who is in coverage to a UE who is out of coverage. In the example shown in FIG. 8, a UE UE_B is in coverage and a UE UE_A is out of coverage. At S802, the UE UE_B forwards a message including information of SL DRX configuration A to be used in a location A and information of an SL DRX configuration B to be used in a location B to the UE UE_A. The message may include the location information as described above in accordance with one or more example embodiments.

The information for the SL DRX configurations may be in an RRC Reconfiguration Sidelink message sent over the PC5 interface by the UE UE_B. Moreover, the SL DRX configurations may be initially received by the UE UE_B from the network (e.g., a gNB) before sending the information for the SL DRX configurations to the UE UE_A or the SL DRX configurations may be determined by the UEs UE_A and UE_B.

In one or more example embodiments, the UE may keep the latest configuration for the VRU relevance area from the latest RRC Reconfiguration message before the UE turns to RRC_IDLE or RRC_INACTIVE state.

The SL DRX configuration procedure for the RRC_IDLE or RRC_INACTIVE cases can be the same for the case when the UE is out of coverage.

Figure 9:
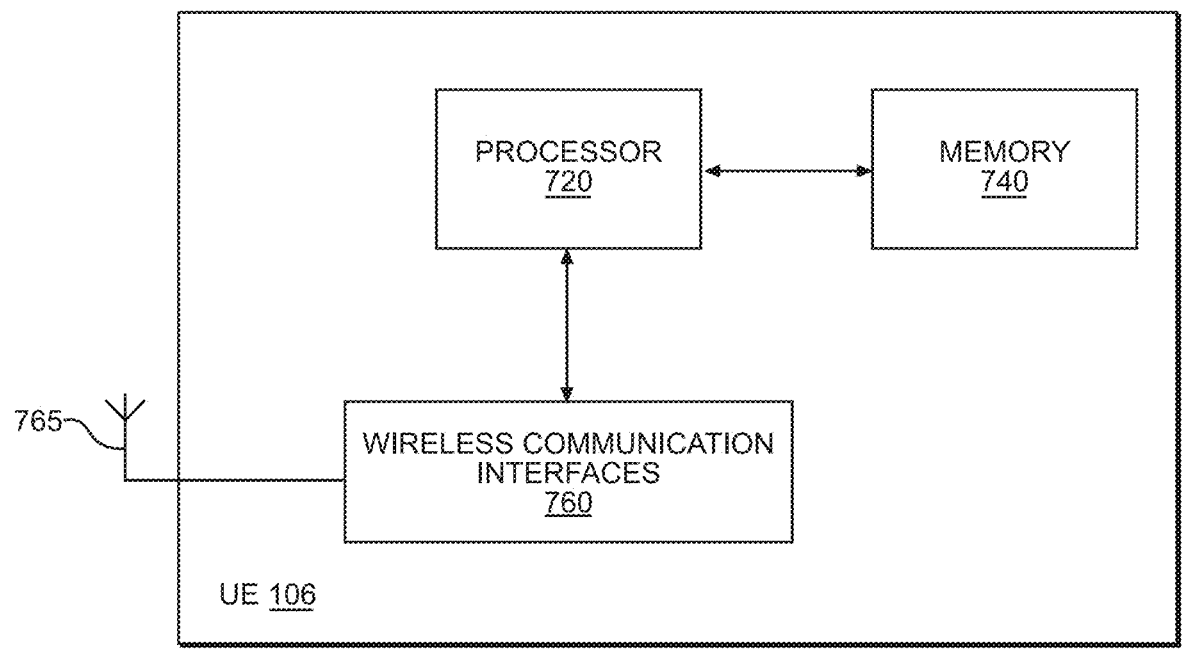
FIG. 9 is a block diagram illustrating an example embodiment of a UE.

FIG. 9 illustrates an example embodiment of the UE 106 shown in FIG. 1.

As shown, the UE 106 includes: a memory 740; a processor 720 connected to the memory 740; various interfaces 760 connected to the processor 720; and one or more (e.g., a plurality of) antennas or antenna panels 765 connected to the various interfaces 760. The various interfaces 760 and the antenna 765 may constitute a transceiver for transmitting/receiving data from/to the gNB 102 via one or more wireless beams or from/to the plurality of TRPs 102A, 102B, 102C, etc. As will be appreciated, depending on the implementation of the UE 106, the UE 106 may include many more components than those shown in FIG. 9. However, it is not necessary that all of these generally conventional components be shown in order to disclose the illustrative example embodiment.

The memory 740 may be a computer readable storage medium that generally includes a random access memory (RAM), read only memory (ROM), and/or a permanent mass storage device, such as a disk drive. The memory 740 also stores an operating system and any other routines/modules/applications for providing the functionalities of the UE 106 (e.g., functionalities of a UE, methods according to the example embodiments, etc.) to be executed by the processor 720. These software components may also be loaded from a separate computer readable storage medium into the memory 740 using a drive mechanism (not shown). Such separate computer readable storage medium may include a disc, tape, DVD/CD-ROM drive, memory card, or other like computer readable storage medium (not shown). In some example embodiments, software components may be loaded into the memory 740 via one of the various interfaces 760, rather than via a computer readable storage medium.

Instructions may be provided to the processor 720 by the memory 740. The processor 720 may be configured to carry out the instructions of a computer program by performing the arithmetical, logical, and input/output operations of the system such that the processor 720 and the memory 740 cause the UE to perform the functions described herein. For example, the processor 720 and the memory 740 including computer program code, the at least one memory and the computer program code configured to, with the at least one processor, cause the user equipment to obtain a message, the message including information identifying a plurality of discontinuous reception configurations, and use one of the plurality of discontinuous reception configurations based on a location of the user equipment.

The various interfaces 760 may include components that interface the processor 720 with the antenna 765, or other input/output components. As will be understood, the various interfaces 760 and programs stored in the memory 740 to set forth the special purpose functionalities of the UE 106 will vary depending on the implementation of the UE 106.

The interfaces 760 may also include one or more user input devices (e.g., a keyboard, a keypad, a mouse, or the like) and user output devices (e.g., a display, a speaker, or the like).

Although not specifically discussed herein, the configuration shown in FIG. 9 may be utilized to implement, inter alia, the TRPs 102A, 102B, 102C, the gNB 102, other radio access and backhaul network elements and/or devices. In this regard, for example, the memory 740 may store an operating system and any other routines/modules/applications for providing the functionalities of the TRPs, gNB, etc. (e.g., functionalities of these elements, methods according to the example embodiments, etc.) to be executed by the processor 720.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing user equipment, base stations, eNBs, RRHs, gNBs, femto base stations, network controllers, computers, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, user equipment, base stations, eNBs, RRHs, gNBs, femto base stations, network controllers, computers, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A user equipment comprising:
   at least one processor; and
   at least one memory including computer program code, the at least one memory and the computer program code configured to, with the at least one processor, cause the user equipment to
   obtain a message, the message including information identifying a plurality of discontinuous reception configurations, each of the plurality of discontinuous reception configurations associated with a different area within a cell, and
   use one of the plurality of discontinuous reception configurations based on at least one of a location of the user equipment or a current time,
   wherein the information identifying the plurality of discontinuous reception configurations includes first discontinuous reception configuration information for a first discontinuous reception configuration, the first discontinuous reception configuration information including first location information, and
   wherein the first location information includes zone identification information identifying an area to use the first discontinuous reception configuration.

2. The user equipment of claim 1, wherein
   the information identifying the plurality of discontinuous reception configurations includes second discontinuous reception configuration information for a second discontinuous reception configuration, the second discontinuous reception configuration information including second location information, and
   the at least one memory and the computer program code are configured to, with the at least one processor, cause the user equipment to use the first discontinuous reception configuration if the location of the user equipment is identified in the first location information and use the second discontinuous reception configuration if the location of the user equipment is identified in the second location information.

3. The user equipment of claim 1, wherein the first location information includes,
   time information identifying a time to use the first discontinuous reception configuration.

4. The user equipment of claim 1, wherein the first location information includes,
   risk information identifying a level of risk associated with at least one location identified in the first location information.

5. The user equipment of claim 1, wherein the information identifying the plurality of discontinuous reception configurations includes the first discontinuous reception configuration information for the first discontinuous reception configuration, the first discontinuous reception configuration information including first time information.

6. The user equipment of claim 5, wherein
   the information identifying the plurality of discontinuous reception configurations includes second discontinuous reception configuration information for a second discontinuous reception configuration, the second discontinuous reception configuration information including second time information, and
   the at least one memory and the computer program code are configured to, with the at least one processor, cause the user equipment to use the first discontinuous reception configuration if the current time is contained in the first time information and use the second discontinuous reception configuration if the current time is contained in the second time information.

7. The user equipment of claim 5, wherein the first time information is associated with the zone identification information identifying the area to use the first discontinuous reception configuration.

8. The user equipment of claim 7, wherein the first time information is associated with risk information identifying a level of risk associated with the zone identification information.

9. The user equipment of claim 1, wherein the at least one memory and the computer program code are configured to, with the at least one processor, cause the user equipment to
   send first use information to at least one of a radio access network element or another user equipment, the first use information identifying the used discontinuous reception configuration.

10. The user equipment of claim 9, wherein the at least one memory and the computer program code are configured to, with the at least one processor, cause the user equipment to
    change the used discontinuous reception configuration to another discontinuous reception configuration of the plurality of discontinuous reception configurations based on the location of the user equipment, and
    send second use information to the at least one of the radio access network element or the another user equipment, the second use information identifying the other discontinuous reception configuration.

11. The user equipment of claim 9, wherein the at least one memory and the computer program code are configured to, with the at least one processor, cause the user equipment to
    change the used discontinuous reception configuration to another discontinuous reception configuration of the plurality of discontinuous reception configurations based on the current time, and
    send second use information to the at least one of the radio access network element or the another user equipment, the second use information identifying the other discontinuous reception configuration.

12. The user equipment of claim 9, wherein the at least one memory and the computer program code are configured to, with the at least one processor, cause the user equipment to
    send the first use information as part of a measurement report.

13. The user equipment of claim 1, wherein the message is a radio resource control message.

14. The user equipment of claim 1, wherein the plurality of discontinuous reception configurations are associated with risks of locations within the cell, respectively.

15. The user equipment of claim 14, wherein the plurality of discontinuous reception configurations include duration time periods associated with the risks.

16. A method comprising:
obtaining a message, the message including information identifying a plurality of discontinuous reception configurations, each of the plurality of discontinuous reception configurations associated with a different area within a cell; and
using one of the plurality of discontinuous reception configurations based on at least one of a location of a user equipment or a current time,
wherein the information identifying the plurality of discontinuous reception configurations includes first discontinuous reception configuration information for a first discontinuous reception configuration, the first discontinuous reception configuration including first location information, and
wherein the first location information includes zone identification information identifying an area to use the first discontinuous reception configuration.

17. The method of claim 16, further comprising:
receiving information using the one of the plurality of discontinuous reception configurations.

18. An apparatus comprising:
at least one processor; and
at least one memory including computer program code, the at least one memory and the computer program code configured to, with the at least one processor, cause the apparatus to,
obtain a plurality of discontinuous reception configurations, and
send a message, the message including information identifying the plurality of discontinuous reception configurations, each of the plurality of discontinuous reception configurations associated with a different area within a cell,
wherein the information identifying the plurality of discontinuous reception configurations includes first discontinuous reception configuration information for a first discontinuous reception configuration, the first discontinuous reception configuration information including first location information, and
wherein the first location information includes zone identification information identifying an area to use the first discontinuous reception configuration.

* * * * *